United States Patent [19]
Aoyagi

[11] Patent Number: 5,138,600
[45] Date of Patent: Aug. 11, 1992

[54] INFORMATION REPRODUCTION APPARATUS HAVING A DISPLAY INCLUDING DUAL OPERATING MODES

[75] Inventor: Yoshio Aoyagi, Kawagoe, Japan

[73] Assignee: Pioneer Electronic Corporation, Tokyo, Japan

[21] Appl. No.: 560,632

[22] Filed: Jul. 31, 1990

[30] Foreign Application Priority Data

Sep. 11, 1989 [JP] Japan .............. 1-106325[U]

[51] Int. Cl.⁵ .............................................. G11B 7/00
[52] U.S. Cl. ........................................ 369/58; 369/32
[58] Field of Search ..................... 369/58, 32, 33; 358/909, 906

[56] References Cited

U.S. PATENT DOCUMENTS

| | | | |
|---|---|---|---|
| 4,746,993 | 5/1988 | Tada | 358/909 |
| 4,817,075 | 3/1989 | Kikuchi et al. | 369/33 |
| 4,858,031 | 8/1989 | Fukuta | 358/906 |
| 4,882,719 | 11/1989 | Kimura et al. | 369/32 |
| 4,894,814 | 1/1990 | Yamada et al. | 369/32 |
| 4,899,326 | 2/1990 | Takeya et al. | 369/33 |
| 4,991,159 | 2/1991 | Tomoda et al. | 369/19 |
| 5,008,875 | 4/1991 | Tomoda et al. | 369/85 |

*Primary Examiner*—Roy N. Envall, Jr.
*Assistant Examiner*—P. Huber
*Attorney, Agent, or Firm*—Sughrue, Mion, Zinn, Macpeak & Seas

[57] ABSTRACT

An information reproduction apparatus comprises a display switching part which performs control for automatically displaying, in an indicator part, the total number of the pieces of music recorded on a recording medium during search for a piece of music intended to be reproduced. This control causes display of the number of a music piece intended to be reproduced on the display device together with the total number of music pieces and permits the operator to know the position of the music piece intended to be reproduced out of the total number of music pieces.

10 Claims, 4 Drawing Sheets

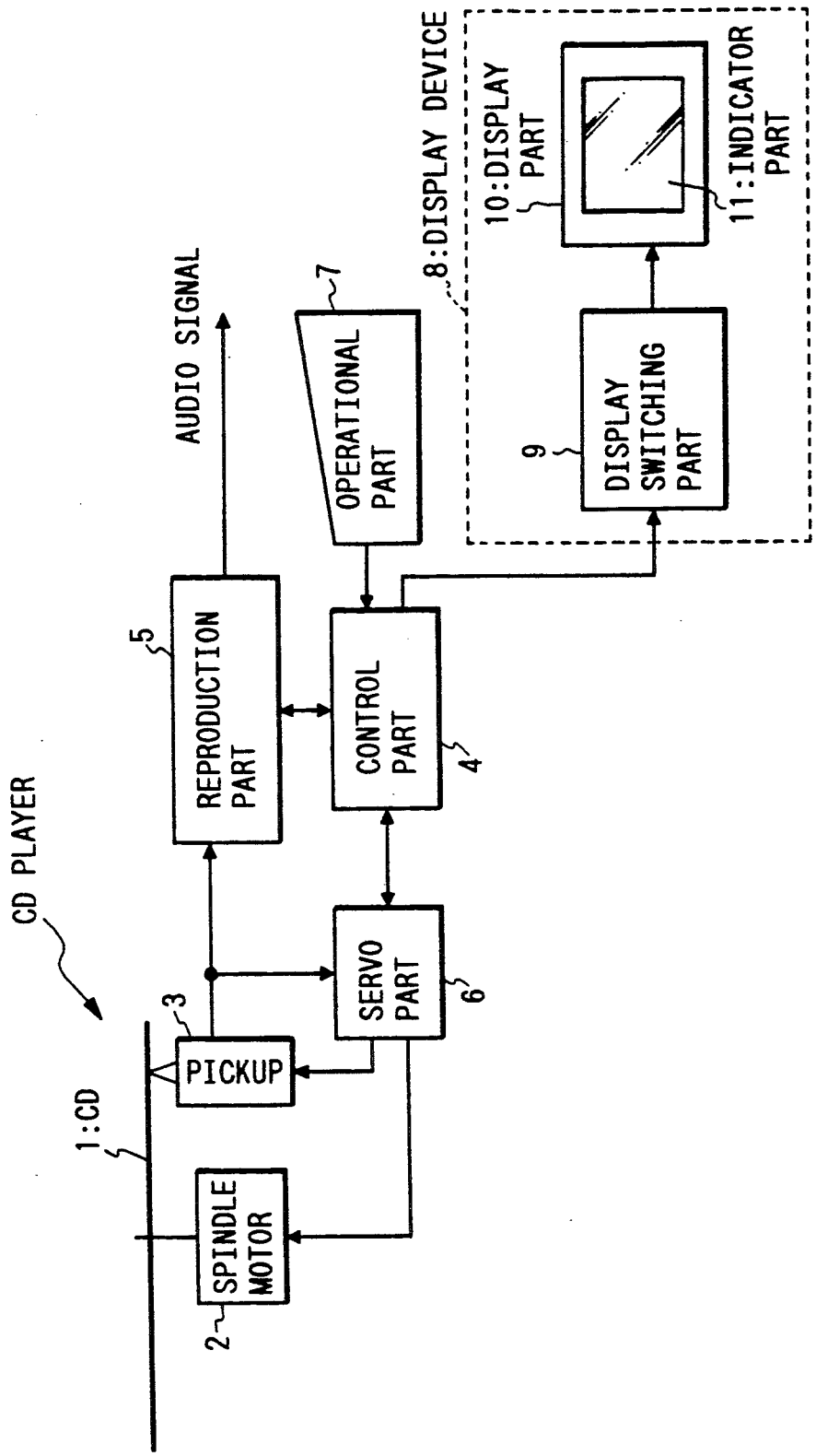

11:INDICATOR PART (TOTAL MUSIC NUMBER, 18; TRACK NUMBER UNDER SEARCH, 11)

☐,▯ : LED TURNED OFF

▨,▧ : LED TURNED ON

| SCAN | TOTAL |
|------|-------|
| 6'20" | 115'15" |

INFORMATION REPRODUCTION APPARATUS HAVING A DISPLAY INCLUDING DUAL OPERATING MODES

BACKGROUND OF THE INVENTION

The present invention relates to a digital information reproduction apparatus such as a compact disk (CD), a digital audio tape recorder (DAT) or the like, and particularly to an improvement in a display device provided in an information reproduction apparatus for vehicles (referred to as "car audio device" hereinafter).

Car audio devices are required to be of small size and easy to handle because they are used under specific conditions, i.e., in automobile cars, apart from home audio devices. The occupied area of the indicator provided on a console panel is therefore limited. It is also generally accepted that the number of information items to be simultaneously displayed on an indicator part is reduced for the purpose of making it easy to see display contents. In this situation, a method of switching and displaying necessary minimum information by using a change-over switch is generally employed for displaying a great amount of information.

Conventional display devices are generally designed so that information about a music piece number currently in reproduction and time information such as an elapsed playing time and the like are displayed on an indicator. When it is desired to know the total number of pieces of music recorded on a CD, the display contents are switched by operating the display change-over switch each time. When the desired music piece to be reproduced is searched for, i.e., during a track search operation, only information on the music piece number to be searched for is displayed on the indicator.

However, there are some cases where it is desired to know the position of the music piece number currently being search for out of the total number of pieces of music recorded on a CD. However, it is difficult to operate the change-over switch for track search during driving. Therefore, the total number of music pieces is not displayed on the indicator. The conventional display devices therefore have a problem with respect to convenience of use.

SUMMARY OF THE INVENTION

It is an object of the present invention to provide a display device which is capable of automatically displaying a piece music number to be searched for and a total number of music pieces during track search.

According to one aspect of this invention, there is provided an information reproduction apparatus having a display means for displaying reproduction information such as track numbers, elapsed playing time, etc. recorded on a recording medium during a mode reproduction, wherein said display means comprises: an indicator means for displaying the total number of pieces of music recorded on said recording medium and a number of a desired music piece intended to be reproduced during a search mode for said desired piece of music in addition to said reproduction information during said reproduction mode; and a display switching means for switching said indicator means between two kinds of displays during said reproduction mode and said search mode.

According to another aspect of this invention, there is provided an information reproduction apparatus having a display means for displaying reproduction information such as track numbers, elapsed playing time, etc. recorded on a recording medium during a mode, wherein said display means comprises: an indicator means for displaying a total playing time of a plurality of music pieces recorded on said recording medium and an elapsed playing time corresponding to a track to be currently searched for in addition to said reproduction information during said reproduction mode; and a display switching means for switching said indicator means between two kinds of displays during said normal reproduction and said search for the desired piece of music.

In the present invention, when the information reproduction apparatus starts the operation of searching for a piece of music intended to be reproduced, the display switching means sends the information about the total number of the pieces or total playing time of music recorded on the recording medium to the display means. The information about the total number of music pieces or total playing time is automatically displayed on the display device together with the desired music number during a search mode of operation.

The present invention configured as described above is capable of automatically indicating the total number of music pieces or total playing time of music recorded on the recording medium and a desired music piece number or an elapsed playing time corresponding to a track to be searched for during search for the desired music piece; without pushing or providing a display change-over switch. The operator can easily recognize the total number of music pieces, thereby improving operability.

Further, since the display is automatically returned to the display produced during reproduction mode of operation after a search has been completed, the operation can be simplified, and the operability can be improved.

BRIEF DESCRIPTION OF THE DRAWINGS

FIG. 2 is a block diagram of the basic configuration of a first embodiment of the present invention;

DESCRIPTION OF THE PREFERRED EMBODIMENTS

Figure 1:
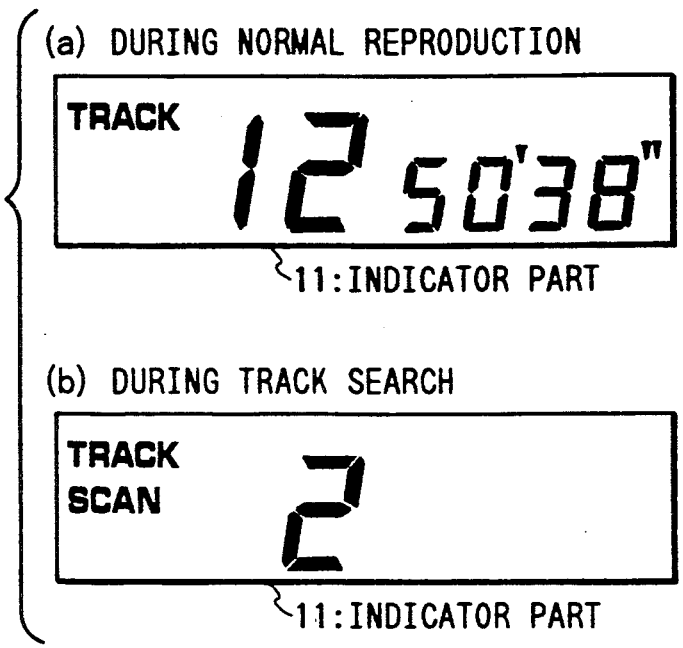
FIGS. 1 (a) and (b) are two explanatory views which show conventional general examples of display during normal reproduction and during track search in a display device for a vehicle CD player, respectively.

In order to aid understanding of the present invention, FIG. 1 shows a general example of the display of an indicator in a vehicle CD player. When the CD player is in a normal reproduction mode, the music number "12" currently in reproduction is displayed on the indicator, and the elapsed playing time "50 minutes and 38 seconds" of the CD is also displayed. Since no other information is displayed, necessary information must be displayed by operating a change-over switch each time so as to change display contents. On the other hand, when a desired music piece is searched for out of the music pieces recorded on the CD, the number of the desired music is preset. At this time, however, only the number "2" of the desired music piece is displayed, with no other display information, as shown in FIG. 1(b). As described above, however, there are some cases where it is desired to know the number (total) of the pieces of music recorded on the CD and the position of the desired music piece in the total of the pieces of music recorded. The present invention in which an improvement is made on this point is described below with reference to embodiments.

FIRST EMBODIMENTS

FIG. 2 shows the block of the basic arrangement of an embodiment in which the present invention is applied to the display device of a vehicle CD player.

In FIG. 2, a CD 1 is rotated at a predetermined speed by a spindle motor 2 so that data on the CD 1 is read by a pickup 3. The read data is provided to an audio reproduction part 5 and a servo part 6 under the control performed by a control part 4.

The audio reproduction part 5 converts the provided data into an audio signal and outputs it. On the other hand, the servos part 6 controls servo such as the spindle servo, a tracking servo and the like on the basis of the provided data.

The control part 4 comprises a microprocessor and, if a command is input from an operational part 7, it performs processing corresponding to the input command on the basis of the command, while controlling the whole of the CD player in accordance with the control program contained in the microprocessor. The control part 4 also controls the display of information on a display device 8, as occasion demands.

The display device 8 comprises a display switching part 9 for switching display information and a display part 10 including an indicator part 11 comprising LCD (liquid crystal display) or the like for displaying display information and a driving circuit (not shown) for the indicator 11.

The display switching part 9 may comprise individual hardware, but, in this embodiment, it is arranged so as to perform switch control on the basis of the control carried out by the control part 4 in accordance with the program for switching the display.

The control part 4 reads TOC (table of contents) information recorded on the CD 1 and stored in a storage part (not shown) during an early stage of reproduction. The control part 4 determines the total number of the pieces of music recorded on the CD 1 on the basis of the TOC information.

Figure 3:
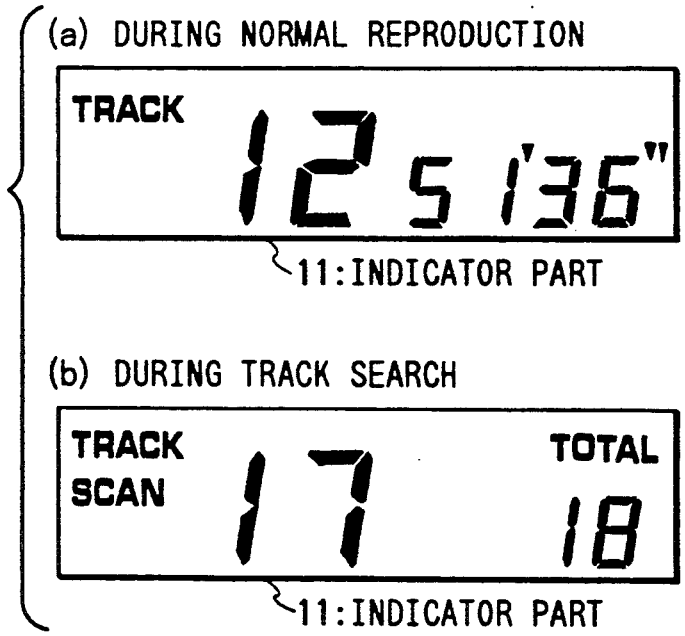
FIGS. 3 (a) and (b) are explanatory views which show a display example of the first embodiment.

During normal reproduction, the display part 10 displays the time information such as the music number currently being played (for example, No. 12), the elapsed playing time (for example, 51 minutes and 36 seconds) and the like on the indicator part 11, as shown in FIG. 3(a).

When a command for track search is input for searching for a desired music piece by the operation of a search key in the operational part 7, the control part 4 directs the display switching part 9 to switch the display on the basis of the stored TOC information. As a result, the information about the music piece number (for example, No. 17) to be searched for is displayed on the indicator part 11 in place of the music number currently being played, and the total number of the pieces of music stored on the CD is displayed in place of the time information, as shown in FIG. 3(b). When the track search is completed, the control part 4 directs the display switching part 9 to switch the display so that the display of the indicator 11 is returned to the normal display, as shown in FIG. 3(a).

Thus, the operator can easily know the position of the track to be searched for in the CD and designate a desired music piece to be searched for. In addition, since the display can be automatically switched, the time required for the operation is saved. Further, since the information on the music piece number searched for is displayed in place of the information on the music number under reproduction, and the total number of music pieces is displayed in place of the time information, the conventional indicator part 11 can be used without any change.

Figure 4:
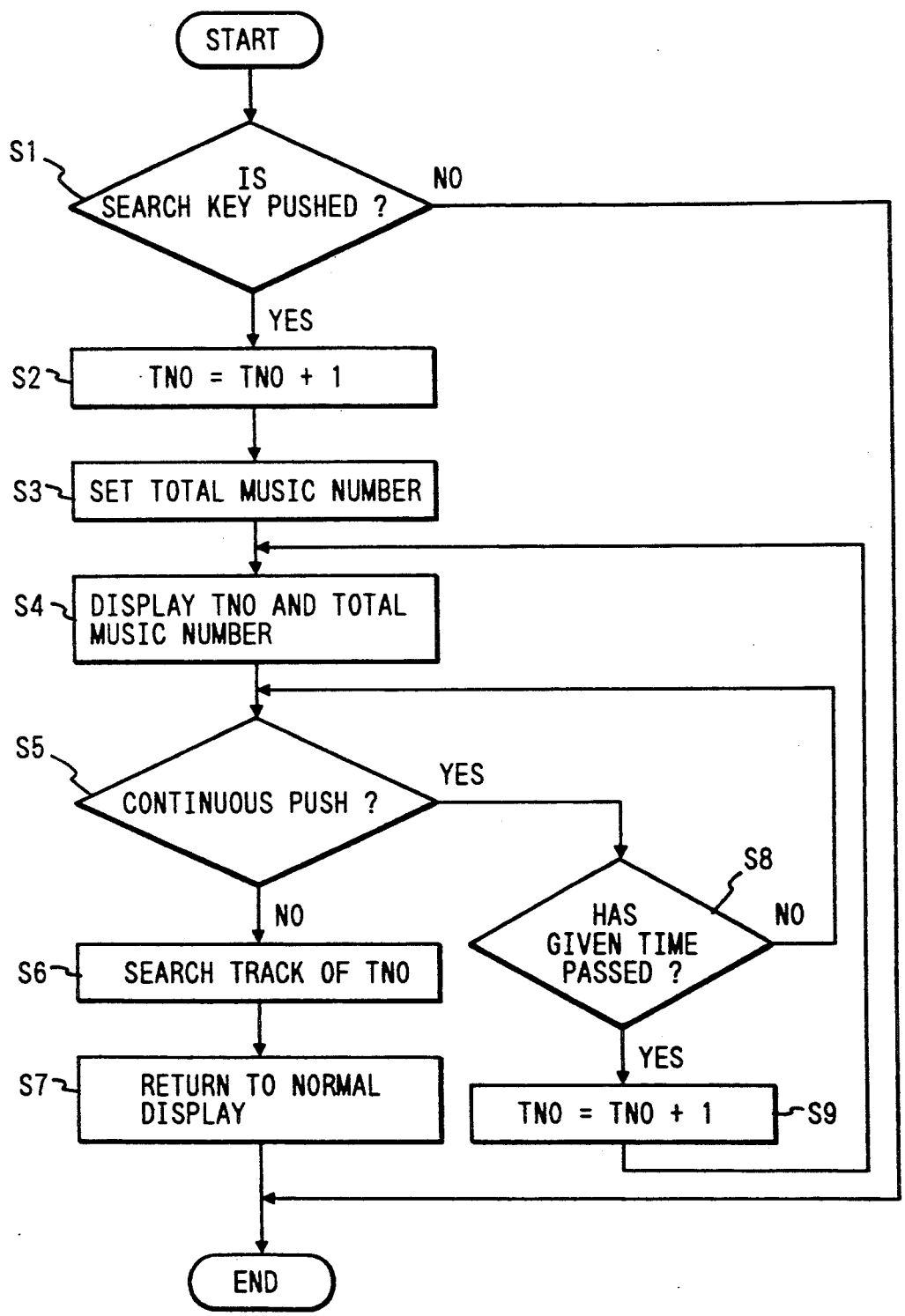
FIG. 4 is a flow chart which shows the operation of the first embodiment.

FIG. 4 shows an example of a flowchart of processing for displaying the total number of music pieces during track search.

The control part 4 decides whether or not the search key of the operational part 7 is pushed (Step S1). If the search key is pushed, the processing goes to Step S2 for performing a search action. If the search key is not pushed, since search is not required, the processing is performed in a normal reproduction routine (not shown). FIG. 3(a) shows an example of display in this normal processing.

In Step S2, the control part 4 increases the track number TNO by one (increment) and gives instructions to move the position of the pickup to the next track. At the same time, the control part 4 incorporates the total number of the pieces of music contained in the CD currently in reproduction from the TOC information and then sets the total number (Step S3). The control part 4 then directs the display switching part 9 to display the track number TNO to be searched and the total music number (Step S4). FIG. 3(b) shows an example of display of the indicator 11 in this state. The control part 4 then decides whether or not the search key is continuously pushed (Step S5).

If the search key is not continuously pushed, the track of the track number TNO displayed is searched for (Step S6). When the track search operation is completed, the control part 4 then directs the display switching part 9 to switch the display so that the display of the indicator part 11 is returned to the display in normal reproduction shown in FIG. 3(a) (Step S7).

If the search key is continuously pushed, a decision is made as to whether or not a predetermined time has passed (Step S8). If the predetermined time has not passed, the processing is returned to Step S5. If the predetermined time has passed, the track number TNO is increased by one (Step S9) so that the processing is returned to Step S4. The subsequent processing is the same as that described above.

In this way, if the search key is pushed, the next music number is searched for. If the search key is continuously pushed, the music number to be searched is successively renewed so that search for music is continuously made. In this way, since the total number of the pieces of music contained in the CD 1 is displayed on the indicator part 11 during the operation of track search, the position of the music piece to be currently searched for out of the total number of music pieces of the CD 1 can be determined, thereby improving the search operability.

SECOND EMBODIMENT

Figures 5, 6:
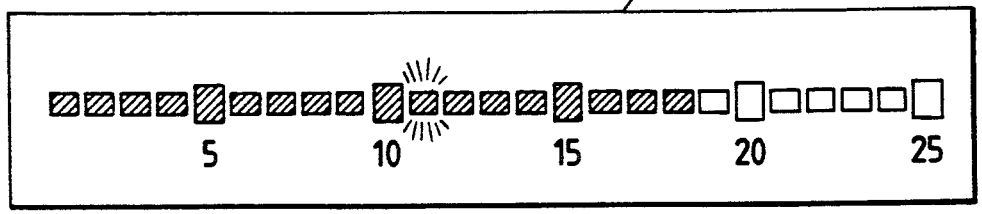
FIG. 5 is a display example of a second embodiment.
FIG. 6 is a display example of a third embodiment.

Although the above-described first embodiment is configured so that the total number of music pieces and the track number TNO are numerically displayed, a second embodiment comprises a plurality of display elements (LED) are linearly arranged in the indicator part 11, as shown in FIG. 5. The display elements of a number corresponding to the total number of music pieces (for example, if the total number of music pieces is 18, the number of display elements is 18) is lighted, and the display element corresponding to the track number TNO (for example, display element No 11) is turned on and off. This arrangement exhibits the same effect as that of the first embodiment.

Although this second embodiment concerns a case where the display elements are linearly disposed, other arrangement forms can be used. In addition, a plurality of music pieces can be caused to correspond to a single display element. In this case, the number of necessary display elements can be reduced.

THIRD EMBODIMENT

Although the total music number is displayed as the information on the total number of music pieces in the above-described first and second embodiments, an embodiment can be arranged so that a total playing time is displayed, and the elapsed playing time corresponding to the track to be currently searched for is displayed in place of the track number TNO.

Although the above description concerns a CD player only, the present invention can be also applied to a DAT system.

The present invention can be also applied to CD players and DAT systems which are provided with an autochanger.

What is claimed is:

1. In an information reproduction apparatus having a display means for displaying reproduction information such as track numbers, elapsed playing time, etc. recorded on a recording medium during a reproduction operation, the improvement in which said display means comprises:
   a) indicator means for displaying search information including a total number of pieces of music recorded on said recording medium and a number corresponding to a desired music piece intended to be reproduced during a search operation for a desired piece of music in addition to said reproduction information during said reproduction operation; and
   b) display switching means for switching said indicator means between said reproduction information and said search information during said reproduction operation and said search operation for the desired piece of music, respectively.

2. An information reproduction apparatus according to claim 1, wherein said indicator means automatically returns to displaying said reproduction information after the search operation for said desired music piece intended to be reproduced is completed.

3. An information reproduction apparatus according to claim 1, wherein said indicator means comprises a liquid crystal display element.

4. An information reproduction apparatus according to claim 1, wherein said indicator means comprises a plurality of light emitting elements linearly arranged so that a number of light emitting elements corresponding to said total number of music pieces are lighted, and a light emitting element corresponding to the position of said desired music piece to be searched for is turned on and off.

5. In an information reproduction apparatus having a display means for displaying reproduction information such as track numbers, elapsed playing time, etc. recorded on a recording medium during a reproduction operation, the improvement in which said display means comprises:
   a) indicator means for displaying search information including a total playing time of music recorded on said recording medium and an elapsed playing time corresponding to a track to be currently searched for during a search operation, said track corresponding to a desired piece of music, in addition to said reproduction information during said reproduction operation; and
   b) display switching means for switching said indicator means between said reproduction information and said search information during said reproduction operation and said search operation for the desired piece of music.

6. A method for operating an information reproduction apparatus having a display means for displaying reproduction information such as track numbers, elapsed playing time, etc. recorded on a recording medium during a reproduction operation, said method comprising the steps of:
   displaying reproduction information including information based on a music piece being reproduced;
   initiating a search operation for a desired music piece out of a plurality of music pieces recorded on said recording medium; and
   displaying search information including first and second information during said search operation, wherein said first information is based on said desired music piece and said second information is based on said plurality of music pieces.

7. The method of claim 6, wherein said search information displaying step comprises the step of displaying search information including a track number corresponding to said desired music piece and a second number corresponding to a total number of said music pieces.

8. The method of claim 6, wherein said search information displaying step comprises the step of displaying search information including an elapsed playing time corresponding to a track to be currently searched during said search operation, said track corresponding to said desired music piece, and a total playing time of said music pieces recorded on said recording medium.

9. The method of claim 6, wherein said search information displaying step comprises the step of displaying search information by energizing a plurality of light emitting elements linearly arranged so as to permit lighting of a number of light emitting elements corresponding to said total number of music pieces and so as to permit intermittent ON state operation of a light emitting element corresponding to a position of said desired music piece.

10. The method of claim 6, further comprising the step of, when said search operation is completed, repeating said reproduction information displaying step.

* * * * *